Figure 1:
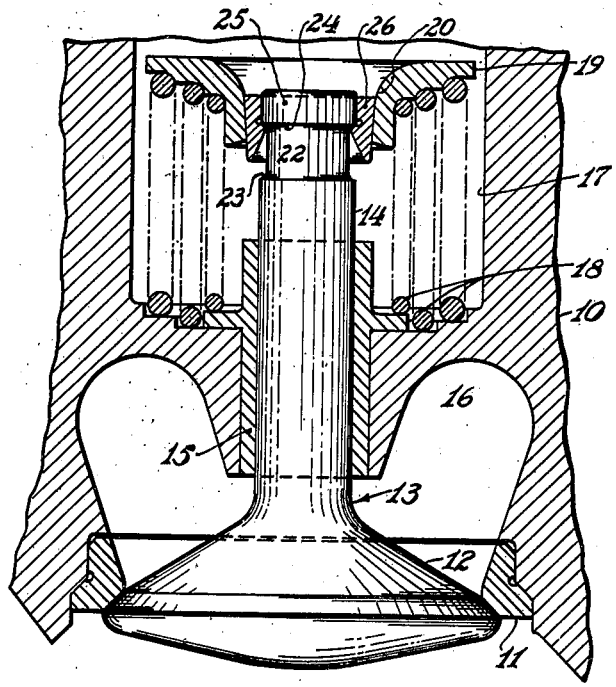

March 16, 1943.   E. C. STEINER   2,314,059
VALVE LOCK
Filed July 15, 1941

INVENTOR
Edward C. Steiner.
BY
ATTORNEY

Patented Mar. 16, 1943

2,314,059

UNITED STATES PATENT OFFICE 2,314,059

VALVE LOCK

Edward C. Steiner, Paterson, N. J., assignor to Wright Aeronautical Corporation, a corporation of New York Application July 15, 1941, Serial No. 402,505

1 Claim. (Cl. 251—144)

This invention relates to engine valve gears and is concerned particularly with an improved form of valve lock used for connecting the valve closing springs to the valve stem.

In the usual form of valve as used, for instance, on aircraft engines, the valve stem, toward its end, is provided with a groove embraced by a washer against which the valve springs bear, a pair of segmental valve locks being fitted to a taper in the washer bore and being engaged with the valve stem groove to abut against the surface of the groove and against its upper and lower ends. The valve spring precompression serves to prevent displacement of the valve locks in normal operation whereas, for removal of the valve locks and springs, the springs are manually compressed to clear the valve locks from the washer whereupon they drop out. In the high duty conditions encountered in aircraft engines, difficulty has been experienced with conventional valve locks in that they tend to abrade or scuff the surface of the valve stem groove, thereby weakening the structure and allowing for incipient cracks in the valve stem which have at times resulted in valve stem failure and have permitted the valve to drop into the engine cylinder.

Figure 2:
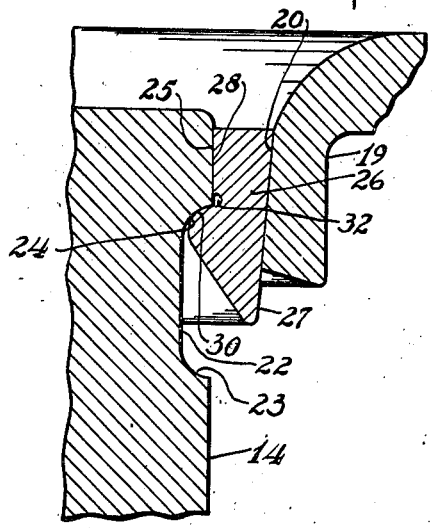

An object of the present invention is to provide a valve lock arrangement which will wholly prevent abrasion of the valve stem at its critically stressed portion, a further object being to prevent contact of the valve lock with any small diameter part of the valve stem. A further object is to provide a valve lock which will be centered by a large diameter part of the valve stem and which will bear upon the valve for lifting same only at abutments which are normal to or angled with respect to the valve axis. Further objects of the invention will become apparent in reading the annexed detailed description in connection with the drawing, in which:

Fig. 1 is a section through a portion of an engine cylinder head showing a valve and spring mounting along with the valve lock of this invention; and Fig. 2 is an enlarged fragmentary section of a part of Fig. 1.

In the drawing, 10 represents a portion of an engine cylinder head including a shrunk-in valve seat 11 against which the head 12 of a valve 13 seats, the valve 13 including a stem 14 constrained to axial movement by a valve guide 15 shrunk into the cylinder head. Between the guide 15 and the seat 11, a gas port 16 is formed. Above the gas port is a recess 17 providing access to the valve guide 15 and to a nest of valve springs 18 which embrace the valve 13 and which seat at their lower ends on the bottom of the recess 17, one of the valve springs if desired, seating on a flange of the valve guide 15 to hold the guide in position. The upper ends of the springs 18 seat upon a washer 19 which embraces the valve stem 14 and which is provided with a tapered bore 20. The valve stem 14 has formed therein a groove 22 whose major surface is cylindrical, the ends of the groove blending into the full diameter portions of the valve stem at fillets 23 and 24. Above the upper fillet 24 is a full diameter valve stem end portion 25. Valve locks 26 comprising segments each having an embracement of slightly less than 180° are fitted to the valve stem end 25 and are externally tapered as at 27 to engage the tapered bore 20 of the spring washer 19. The upper portion of the inside of each valve lock 26 has an internal cylindrical surface 28 fitted to the cylindrical surface of the valve stem end 25 whereby the valve lock is held in concentric relation with the valve. Below the portion 28 is an inwardly projecting annular shoulder 30 struck on a radius slightly less than the radius of the fillet 24 at the top of the valve stem groove 22 so that when assembled, the shoulder 30 engages the fillet 24 but has no contact whatever either with the groove 22 or with the fillet 23. Closing force imposed on the valve by the springs 18 is accordingly imposed wholly through the contact of surfaces 24 and 30 and the cylindrical portions 25 and 28 of the valve stem and of the valve locks.

It is apparent that the diameter of the valve stem at the groove 22 is smaller than any other part of the stem and thus this small diameter portion is subjected to the greatest stress concentration. Since there is clearance relation between the groove surface 22 and the valve lock, the latter can cause no abrasion and weakening of the valve stem. Should any abrasion occur, it will be on the fillet 24 or on the cylindrical portion 25 of the valve stem which, however, are not subjected to high stress concentration and thus, the possibilities of failure of the valve stem are minimized.

It is known that valve locks have been suggested in the prior art that do not have contact with the small diameter portions of the valve stem and they do depend for proper location upon engagement with some portion of the surface of the valve stem groove, which characteristic is wholly absent in the present design. Also, prior art devices have usually provided positive axial location in both directions for the valve locks but since the valve springs always urge the valve lock outwardly along the valve stem, axial location of the lock with respect to the stem is necessary in but one direction—the other direction for axial location is redundant and no provision has been made for it in the present design.

In order to simplify machining operations and to avoid sharp corners in fabrication, a small annular groove 32 is formed at the junction of the valve lock portions 28 and 30, thus permitting the valve lock shoulder 30 to have bearing engagement with the uppermost surface of the fillet 24 adjacent the cylindrical valve stem portion 25.

While I have described my invention in detail in its present preferred embodiment, it will be obvious to those skilled in the art, after understanding my invention, that various changes and modifications may be made therein without departing from the spirit or scope thereof. I aim in the appended claim to cover all such modifications and changes.

I claim as my invention:

In combination, a valve stem having a cylindrical end portion and a reduced diameter portion adjacent thereto, the two said portions joining one another in a shoulder; a lock for said stem, comprising segmental elements, having a hollow cylindrical portion at one end only for fitting engagement about said stem cylindrical end portion and having an inwardly projecting abutment portion at the other end for engagement against said shoulder, said abutment portion being of less internal diameter than the internal diameter of said hollow cylindrical portion but of greater internal diameter than the minimum diameter of the reduced diameter portion of the valve stem adjacent the cylindrical end portion of said stem.

EDWARD C. STEINER.